United States Patent
Maslov

(12) 
(10) Patent No.: US 9,122,521 B2
(45) Date of Patent: Sep. 1, 2015

(54) ENABLING MULTIPLE OPERATING SYSTEMS TO RUN CONCURRENTLY USING BARRIER TASK PRIORITY

(75) Inventor: Guennadi Maslov, Rueil-Malmaison (FR)

(73) Assignee: VIRTUALLOGIX SA, Montigny-le-Bretonneaux (FR)

( * ) Notice: Subject to any disclaimer, the term of this patent is extended or adjusted under 35 U.S.C. 154(b) by 1262 days.

(21) Appl. No.: 12/376,822

(22) PCT Filed: Aug. 9, 2007

(86) PCT No.: PCT/EP2007/007074
§ 371 (c)(1),
(2), (4) Date: Aug. 4, 2009

(87) PCT Pub. No.: WO2008/017489
PCT Pub. Date: Feb. 14, 2008

(65) Prior Publication Data
US 2010/0017806 A1    Jan. 21, 2010

(30) Foreign Application Priority Data
Aug. 9, 2006   (EP) ...................................... 06291297

(51) Int. Cl.
*G06F 9/455*    (2006.01)
*G06F 9/48*    (2006.01)

(52) U.S. Cl.
CPC .......... *G06F 9/4881* (2013.01); *G06F 9/45537* (2013.01)

(58) Field of Classification Search
None
See application file for complete search history.

(56) References Cited

U.S. PATENT DOCUMENTS

| 7,493,515 | B2 * | 2/2009 | Armstrong et al. ............. 714/10 |
| 7,565,652 | B2 * | 7/2009 | Janssen et al. ................ 718/103 |
| 7,823,157 | B2 * | 10/2010 | Need et al. ..................... 718/108 |
| 8,104,033 | B2 * | 1/2012 | Chiaramonte et al. ............ 718/1 |
| 2005/0149933 | A1 | 7/2005 | Saito et al. |

FOREIGN PATENT DOCUMENTS

WO    WO 2006/018307    2/2006

OTHER PUBLICATIONS

International Search Report for PCT/EP2007/007074 mailed Oct. 22, 2007.

* cited by examiner

*Primary Examiner* — Eric C Wai
(74) *Attorney, Agent, or Firm* — Nixon & Vanderhye PC

(57) ABSTRACT

The invention relates to a method of enabling multiple operating systems to run concurrently on the same computer, the method comprising: scheduling a plurality of tasks for execution by at least first and second operating systems, wherein each task has one of a plurality of priorities; setting the priority of each operating system in accordance with the priority of the next task scheduled for execution by the respective operating system; and providing a common program arranged to compare the priorities of all operating systems and to pass control to the operating system having the highest priority. Accordingly, the invention resides in the idea that different operating systems can be run more efficiently on a single CPU by changing the priority of each operating system over time. In other words, each operating system has a flexible priority.

45 Claims, 8 Drawing Sheets

ENABLING MULTIPLE OPERATING SYSTEMS TO RUN CONCURRENTLY USING BARRIER TASK PRIORITY

This application is the U.S. national phase of international Application No. PCT/EP2007/007074 filed 9 Aug. 2007 which designated the U.S. and claims priority to European Patent Application No. 06291297.7 filed 9 Aug. 2006, the entire contents of each of which are hereby incorporated by reference.

This invention relates to a method of enabling multiple operating systems to run concurrently on the same computer on the basis of "finer grained operating system scheduling".

BACKGROUND

For some computer programs, it is critical that steps in the program are performed within defined time periods, or at defined times. Examples of such programs are control programs for operating mobile telephones. Typically, the program must respond to external events or changes of state in a consistent way, at or within a certain time after the event. This is referred to as operating in "real time".

For many other programs, however, the time taken to execute the program is not critical. This applies to most common computer programs, including spreadsheet program and word processing programs. On the other hand, whilst the exact time taken by such programs is not critical, in most cases, users would prefer quicker execution where this is possible.

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several programs to operate concurrently. To do so, they provide scheduling; in other words, they share the usage of the resources of the computer between the different programs, allocating time to each in accordance with a scheduling algorithm. Operating systems of this kind are very widely used, but they generally make no provision for running real time applications, and they therefore are unsuitable for many control or communications tasks.

For such tasks, therefore, real time operating systems have been developed; one example is ChorusOS (also know as Chorus) and its derivatives.

These operating systems could also be used to run other types of programs. However, users understandably wish to be able to run the vast number of "legacy" programs which are written for general purpose operating systems such as Windows or Linux, without having to rewrite them to run on a real time operating system.

To address this need, the applicant has developed a method for running multiple operating systems simultaneously, even when the operating systems are designed for different purposes. A detailed description of this method is provided in WO2004/090719 which is incorporated herein by reference.

In particular, the method allows for one of the operating systems (for example, a real time operating system) to perform without disturbance, and the other (for example, a general purpose operating system) to perform as well as possible using the remaining resources of the computer. That is, the multiple operating systems are slightly modified and provided with a common program which schedules between them, in which one of the operating systems (the "primary" or "critical" operating system) is favoured over another (the "secondary" or non-critical operating system). The method allocates hardware preferentially to the critical operating system, and it denies the secondary operating system or systems access which would interfere with that of the critical operating system. The secondary operating systems are modified so that they cannot mask interrupts, and their interrupt service routines are modified to make them responsive to messages indicating that an interrupt occurred. The common program handles all hardware exceptions by passing them to the interrupt service routines of the primary operating system, and where a hardware interrupt was intended for one of the secondary operating systems, an interrupt message or notification is generated. Next time that secondary operating system is scheduled by the common program, the message or notification is passed to it, and the common program calls its interrupt service routine to service the interrupt. This is referred to as "virtual" interrupts.

Thus, the secondary operating systems cannot pre-empt the primary operating system (or, in general, a higher importance secondary operating system) in any way on occurrence of an interrupt, since all are initially handled by the primary operating system and only notified to the secondary operating system for which they are destined after the primary operating system has finished execution and that secondary operating system is scheduled.

Handling of such interrupts is thus deferred until no critical task in the primary operating system is occurring. When they are eventually actioned, however, the routines of the secondary operating system may operate substantially unmodified fashion so that the behaviour is (except for the delay) as expected by the secondary operating system.

In the above described method, tasks of the primary operating system are always performed prior to concurrent tasks of the second operating system. However, different tasks may have different priorities. For example, a task of the primary operating system may be less important than a task of the secondary operating system. This may result in undesired latencies in respect of (some) tasks of the secondary operating systems.

One way to deal with this problem would be to provide a task scheduler for scheduling the order of tasks in both (all) operating systems. However, this would be complicated and inefficient.

It is an object of the present invention to address these problems. In particular, it is an object of the present invention to improve the efficiency of performing tasks of the secondary operating system(s). More particularly, it is an object of the present invention to reduce the (interrupt) latency in respect of tasks of the secondary operating systems. Furthermore, it is an object of the invention to achieve this without employing a dedicated task scheduler.

SUMMARY OF THE INVENTION

According to the invention, there is provided method of enabling multiple operating systems to run concurrently on the same computer, the method comprising: scheduling a plurality of tasks for execution by at least first and second operating systems, wherein each task has one of a plurality of priorities; setting the priority of each operating system in accordance with the priority of the next task scheduled for execution by the respective operating system; and providing a common program arranged to compare the priorities of all operating systems and to pass control to the operating system having the highest priority.

In an embodiment of the invention, each operating system performs a barrier routine in between consecutive tasks, thereby to split consecutive tasks into tasks of different importance. The barrier routine can be performed in response to an interrupt. Performing the barrier routine may comprise passing control to the common program to cause a decrease of the priority of the operating system performing the barrier routine. The common program may pre-empt the operating system performing the barrier routine if, after decreasing its priority, another operating system has a higher priority, and passes control to the higher priority operating system. If control is passed to the higher priority operating system, the barrier routine may remain active. Performance of the barrier routine may be resumed when control is passed back to the operating system in which the barrier routine has remained active.

Generally, the common program may be invoked to pass control to the operating system having the highest priority when a barrier routine has been performed.

In one embodiment of the invention, each operating system is adapted to perform multiple barrier routines, wherein each barrier routine is associated with tasks of a specific priority and/or each barrier routine causes a different decrease of the priority of the respective operating system.

Preferably, each operating system is arranged to invoke the common program to cause a decrease of its own priority. In particular, each operating system causes a decrease of its own priority upon completion of a task if no further task having a priority equal to or higher than the priority of the completed task is scheduled for execution.

On the other hand, the common program may be adapted to increase the priority of any of the operating systems. In particular, the common program may increase the priority of an operating system when that operating system receives an interrupt. More particularly, the common program increases the priority of an operating system to a respective highest level when that operating system receives an interrupt.

In one embodiment of the invention, the common program is invoked to pass control to the operating system having the highest priority after an operating system has become inactive. In particular, the common program is invoked to pass control to the operating system having the highest priority after the priority of an operating system has been set to a different level.

In one embodiment of the invention, all interrupts are initially processed by an interrupt handling routine of the first operating system, and those intended for the second operating system are forwarded to the second operating system for processing by an interrupt handling routine of the second operating system when the common program next passes control to the second operating system.

In one embodiment of the invention, each operating system has a highest priority, wherein the highest priority of the first operating system is higher than the highest priority of the other priority systems.

The first operating system may be a real time operating system, and the second operating system may be a non-real time, general-purpose operating system.

The present invention resides in the idea that different operating systems can be run more efficiently on a single CPU by changing the priority of each operating system over time. In other words, each operating system has a flexible priority.

Accordingly, the scheduling between the operating systems takes into account that different tasks have different priorities. Thus, a task of a high priority operating system may be less important than a task of a low priority operating system. Scheduling is thus no longer performed on the basis of the priority of the operating systems only so that tasks to be performed by the high priority system operating system will no longer be always performed first.

The present invention thereby decreases interrupt and task latency in respect of tasks to be executed by lower priority operating systems.

Until now, the primary (real time) operating system was considered something "monolithic" and innately the highest priority operating system at all times. The present invention is based on the realisation that by providing exceptions to this rule and permitting pre-emption of the primary operating system in certain circumstances, the reactivity of the secondary operating system(s) can be improved and interrupt latency improved.

According to the invention, the primary operating system is no longer considered "monolithic", and activities thereof are differentiated. A general "guarantee" that all tasks of the primary operating are executed prior to tasks of the secondary operating system(s) no longer exists; it now only applies to certain high priority tasks. In other words, the secondary operating system(s) can pre-empt the primary operating system in certain circumstances.

To this end, a common program is provided which assigns a priority to each operating system, and which schedules operating systems according to their priority. The priority which is assigned to each operating system is adapted over time. Accordingly, the secondary operating system(s) can pre-empt the primary system if the primary operating system starts to perform less tasks which are less "important" than tasks to be executed by the secondary operating system(s), i.e. when the primary operating system has a lower priority than the secondary operating system(s).

In order to change the priority of the operating systems over time, each operating system causes the common program to change its priority when it switches from one task to another task having a lower priority. In particular, each operating system can invoke the common program to decrease its priority. However, no operating system may cause the common program to increase its priority. The priority of an operating system can only be increased by the common program upon receipt of an interrupt intended for that operating system.

The invention thus provides priority-based operating system scheduling. Scheduling decisions are made on the basis of the priority assigned to each of the operating systems without the need to "look inside" the priority systems, i.e. without having to analyse the (priority of the) tasks scheduled for execution by each operating systems. In other words, instead of making scheduling decision on the basis of task priorities "inside" each operating system, they are made on the basis of the priority of the operating systems themselves.

In a preferred embodiment, as described above, barrier routines (tasks) are employed to split all activities (tasks) "inside" each operating system into "more important" and "less important" activities. The barrier routines are scheduled by the native task scheduler "inside" each operating system, and each operating system is modified to activate the barrier routine in response to interrupts. The barrier routine when activated invokes the common program which in turn may decrease the priority of the operating system in which the barrier routine has become active.

BRIEF DESCRIPTION OF THE DRAWINGS

Embodiments of the invention will now be described, by way of example only, with reference to the accompanying drawings, in which.

DETAILED DESCRIPTION OF THE DRAWINGS

General Principles

As described above, the multiple operating systems to which the present invention can be applied are slightly modified and provided with a common program designed to run multiple operating systems on a single CPU. One of the operating systems has a relatively higher priority and will be referred to as the primary operating system, while one or more other priority systems have a relatively lower priority. For the sake of simplicity, in the following, it will be assumed that there is only a single lower priority operating system referred to as the secondary operating system. It will be understood, though, that more than one secondary priority operating system can be provided.

The primary operating system is a real time operating system which runs an application consisting of multiple tasks. In the example illustrated in FIG. 1, the application consists of three event driven tasks T1, T2 and T3. Each task is triggered by external hardware interrupts ($I_P$). Each task should must be completed by respective deadlines D1, D2 and D3. In order to meet these deadlines, each task is allocated a different priority. For example, T2 has a the earliest deadline and therefore has the highest priority and can pre-empt T1 or T3.

In the above described known implementation of the common program, the order of the tasks of the primary operating system is not changed if the secondary operating system also requests execution of tasks. This is illustrated in FIG. 2.

Figure 1:
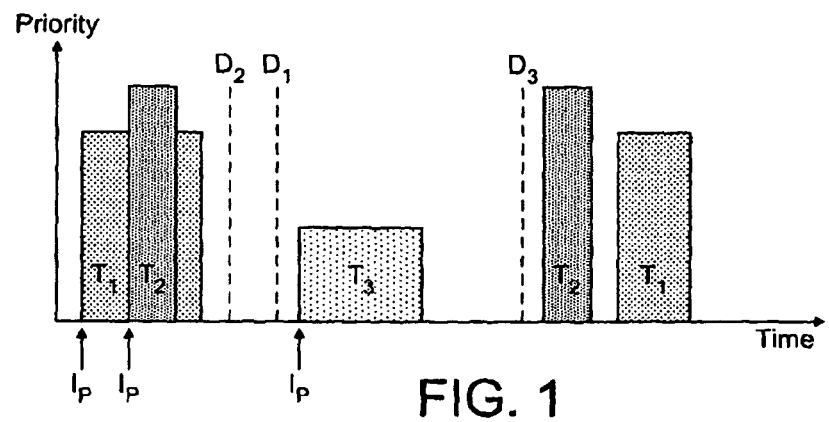
FIGS. 1 to 4 illustrate the general principles of running multiple operating systems on a single CPU.
Figure 2:
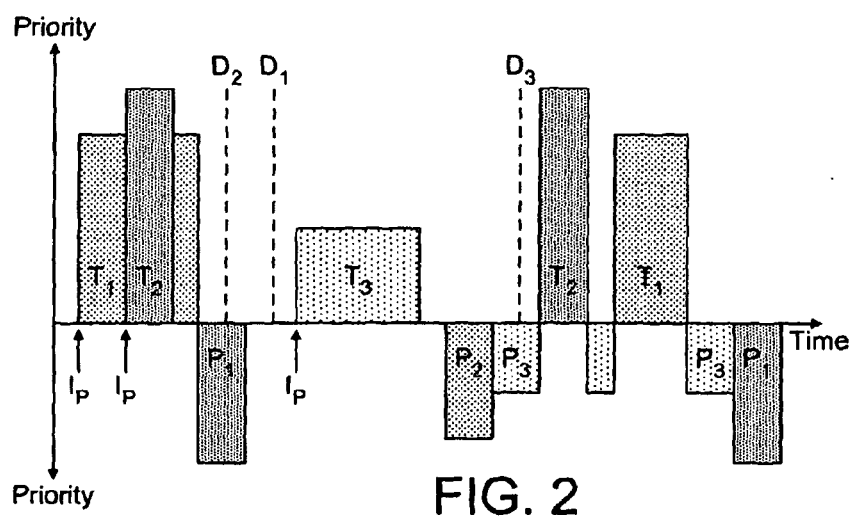

In FIG. 2, the secondary operating system requests execution of three non-real-time processes P1, P2 and P3. In this case, the real time tasks T1, T2 and T3 are executed at the same time as shown in FIG. 1, i.e. the start and completion times in respect of T1, T2 and T3 are not changed. The processes P1, P2 and P3 are executed when and only when the primary operating system is in the idle state.

If required, the common program can interrupt execution of the secondary operating system processes at any time. The secondary operating system is adapted never to mask hardware interrupts. As a consequence, an interruption of secondary operating system processes is possible even when critical sections or an interrupt handler are executed. The common program is adapted to mask hardware interrupts in order to perform software interrupt masking in the secondary operating system. Such masking is performed for short fixed periods of time only. Therefore, it only minimally affects the interrupt latency of the primary operating system.

In the example of FIG. 2, real-time tasks T1 and T2 of the primary operating system interrupt the non-real-time process P3 of the secondary operating system.

Figure 3:
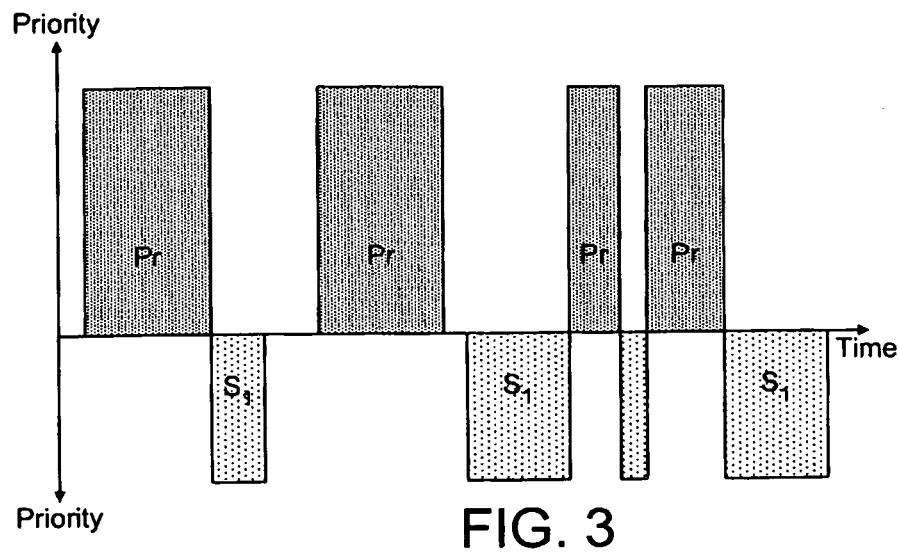

The common program is adapted to consider each operating system as a single scheduling object. It does not distinguish between different types of tasks or processes "within" an operating system. Thus, from the common program's "point of view", the time line of FIG. 2 can be represented as shown in FIG. 3. As illustrated, instead of tasks T1, T2 and T3 and processes P1, P2 and P3, the common program "sees" the primary operating system Pr and the secondary operating system S1.

Figure 4:
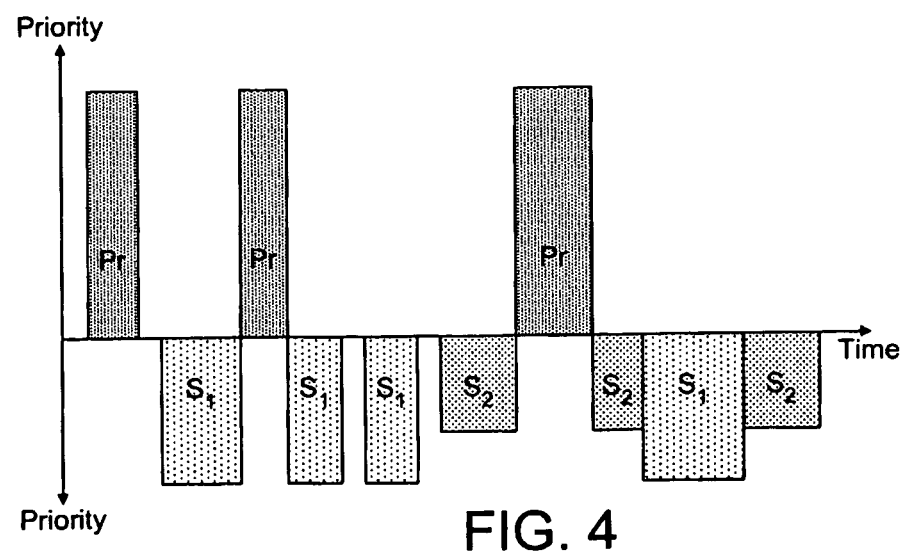

As indicated above, the common program can schedule between multiple secondary operating systems, each of which may have a different priority. The common program is adapted to schedule between multiple secondary operating systems like conventional priority based schedulers. That is, when a secondary operating system of higher priority is ready to become active, it interrupts the currently active lower priority secondary operating system. This is illustrated in FIG. 4.

The secondary operating system S1 has a higher priority than the secondary operating system S2. Accordingly, S1 interrupts S2 if and when needed. The primary operating system has the highest priority and interrupts both S1 and S2. In this way, the common program is similar to a conventional priority-based operating system task schedulers.

Fine Grained OS Scheduler

Figure 5:
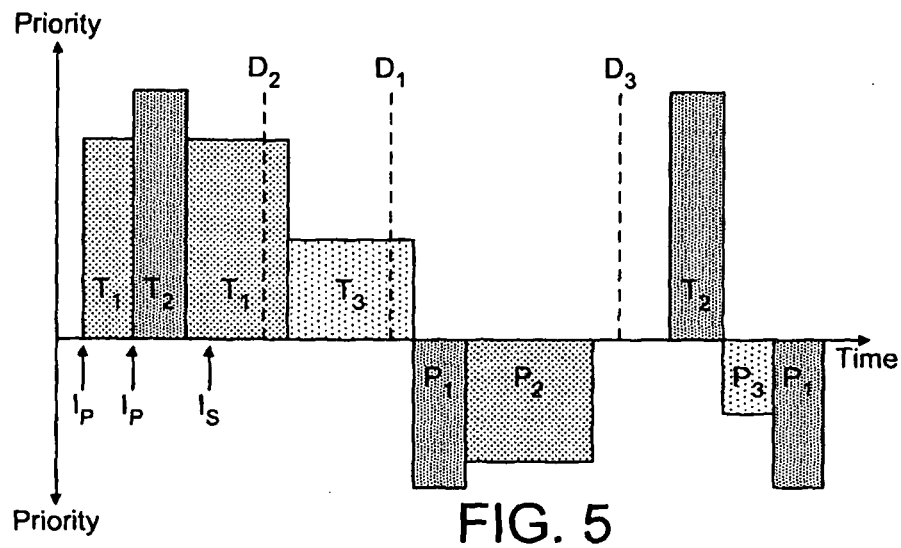
FIGS. 5 to 11 illustrate the operation of a finer grained operating system scheduler according to embodiments of the present invention.

FIG. 5 illustrates the potential high interrupt latency for secondary interrupts IS due to continuous CPU activity through the primary operating system. If continuous CPU activity is required by the primary operating system in order to meet real-time task deadlines, such latency is unavoidable. However, if, as indicated in the above example, some primary real-time tasks can be deferred, the latency in respect of (some) secondary interrupts can be reduced.

Figure 6:
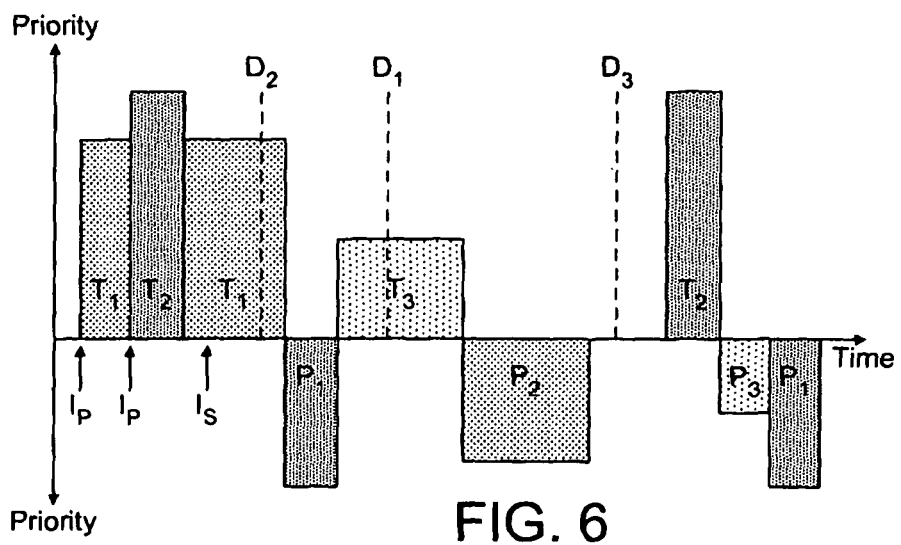

In the illustrated example, the primary operating system runs two high priority real-time tasks T1 and T2 associated with tight deadlines D1 and D2, respectively. The real-time task T3 has a lower priority and a later deadline D3. Accordingly, the real-task T3 could be deferred and a non-real-time secondary process P1 could be executed before T3. The deadline $D_3$ would still be met. This is illustrated in FIG. 6.

In this example, the secondary operating temporarily assumes a higher priority than the primary operating system and pre-empts it. This type of operating system scheduling is referred to as "Finer Grained OS Scheduling". A common program is provided which performs operating system scheduling. It is also referred to as "OS scheduler" in the description and "OSware" in the figures. The OS scheduler adapted to implement such Finer Grained OS Scheduling will be referred to as the "Finer Grained OS Scheduler".

It is to be noted that in this example, neither the primary operating system nor the OS scheduler controls how long the secondary process P1 monopolises the CPU. Therefore, prolongated CPU occupation by the process P1 should be prevented by adequate steps.

In an embodiment of the invention, the Finer Grained OS Scheduler is characterised by the following features:
  it is a OS priority based scheduler;
  the OS priority may vary over time depending the importance of the currently performed activity;
  the primary operating system is involved in the scheduling and may be pre-empted by the secondary operating system if necessary.

As described above, the OS scheduler considers each operating system as a single scheduling object. It does not distinguish between tasks or processes "within" the operating systems and is "unaware" as to whether the currently performed activity is important or not.

In order to implement Finer Grained OS Scheduling, each operating system is adapted to explicitly inform the OS scheduler about priority changes through a OS scheduler priority setting function.

This function always reduces the priority of the currently active operating system to a level provided as a function parameter. The function cannot be used to raise the current priority. The function is invoked when there is no more current operating system activity of a specific type, as will be described below. The priority of an operating system is raised to an initial level by the OS scheduler when it forwards an interrupt to that operating system.

The Finer Grained OS Scheduler is invoked in the following cases:
- an interrupt is forwarded to an operating system;
- the OS scheduler priority setting function is invoked and an operating system becomes inactive;
- the OS scheduler priority setting function is invoked and an operating system changes its current priority.

The OS scheduler compares the current priorities of all operating systems and switches to the operating system with the highest priority.

In the Finer Grained OS Scheduler, the OS scheduler idle function is also used to change the priority of the current operating system. It reduces the priority to the lowest possible value, e.g. to a level of $P_{IS}=0$ for secondary operating systems and of $P_{IP}=1$ for the primary operating system. In this way only operating system priorities need to be considered in order to elect an operating system to run on the CPU.

Like the OS scheduler idle function, the OS scheduler priority setting function also has a return value. It is 0 if the current operating system has been rescheduled as the highest priority operating system because of OS scheduler idle or OS scheduler priority setting function calls performed by other operating systems. It is 1 if the current operating system has been scheduled because of a forwarded interrupt.

Preferably, the OS scheduler priority setting function is invoked by barrier tasks or processes. Barrier tasks or processes are used to separate operating system activities of different importance from one another.

The operation of the Finer Grained OS Scheduler will now be described on the basis of some examples.

In the first example, let us suppose there is only one secondary operating system and two types of real-time tasks in the primary operating system, namely high priority real-time tasks with short periods of continuous CPU activity and less important tasks with potentially long periods of continuous CPU activity, which can block execution of the secondary operating system processes for long periods. Also, let us suppose that the less important tasks are not significantly affected if the primary operating system is pre-empted by the secondary operating while the Primary OS executes those tasks.

A dedicated barrier task $T_b$ is introduced to separate high priority and low priority activities in the primary operating system from one another.

If the primary operating system runs high priority real-time tasks on a priority level of $P_{RT}$ or higher and low priority tasks on a priority level of $P_L$ or lower, the priority $P_b$ of the barrier task Tb should be between $P_{RT}$ and $P_L$: $P_L<P_b<P_{RT}$.

The barrier task $T_b$ performs the following actions in an infinite loop:
- invoking the OS scheduler priority setting function;
- if the return value is 1 reinvoking the OS scheduler priority setting function;
- otherwise invoking a sleeping synchronisation primitive (such as a binary semaphore P operation).

The interrupt handler in the primary operating system is adapted to invoke the barrier task $T_b$ for each interrupt (using, for example, some kind of binary semaphore V operation).

The initial priority $P_{PH}$ for the primary operating system should be higher than the initial priority $P_S$ of the secondary operating system. The barrier task $T_b$ reduces the priority of the primary operating system to a lower level $P_{PL}$:$P_{PL}<P_S<P_{PH}$. In this way, when the barrier task $T_b$ invokes the OS scheduler priority setting function, the primary operating system can be preempted by the secondary operating system. It is noted that even if the primary operating system is pre-empted, the OS scheduler still considers the barrier task Tb active such that when the primary operating system is rescheduled to run on the CPU, it will continue to execute its task.

Figure 7:
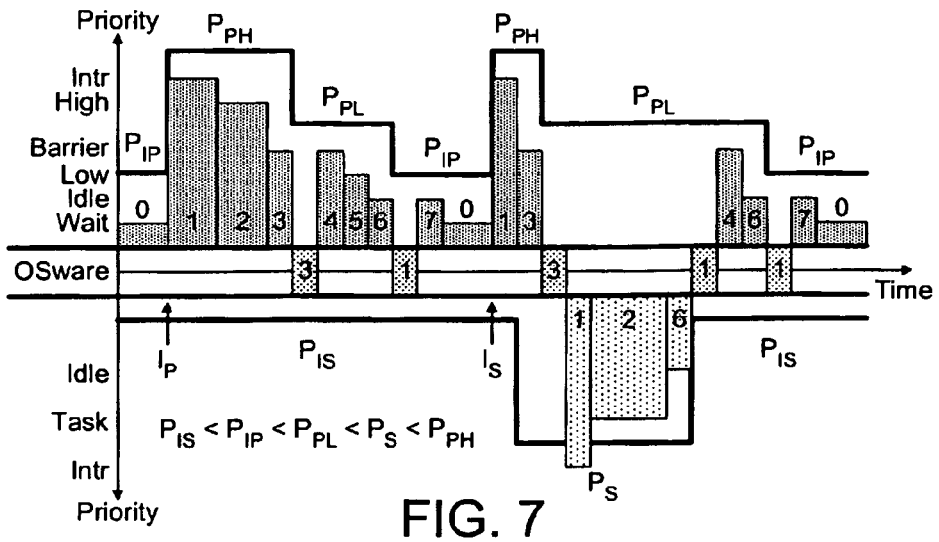

FIG. 7 illustrates how the OS scheduler interrupts and schedules the primary and secondary operating systems while they are in the idle state.

When the primary operating system is in the idle state, it puts the CPU in the wait state (i.e. a power saving mode stage P0).

When the CPU receives a primary interrupt $I_p$, it executes the primary interrupt handler (stage P1). The priority of the primary operating system is raised from $P_{IP}$ to $P_{PH}$. The OS scheduler is not invoked at this stage for optimisation purposes because $P_{PH}$ is the highest operating system priority.

Let us suppose that as a result of the interrupt processing, two real-time tasks are requested—one high and one low priority task. First, the primary operating system schedules the high priority real-time task (stage P2). The barrier task Tb is also invoked by the interrupt handler but not yet executed by the CPU.

When the high priority real-time task has been completed, the primary operating system schedules the barrier task Tb (stage P3). The barrier task Tb invokes the OS scheduler priority setting function. The OS scheduler reduces the priority of the primary operating system to the level $P_{PL}$ (stage O3) and invokes the Finer Grained OS Scheduler. The Finer Grained OS Scheduler determines that the primary operating system is still the highest priority operating system and therefore does not switch to the secondary operating system. The OS scheduler exits the OS scheduler priority setting function with return value of 0.

The primary operating system continues execution of the barrier task Tb. This task analyses the above return value and invokes a sleeping synchronization primitive (stage P4).

The primary operating system now schedules the low priority real-time task (stage $P_S$). When this task is completed the primary operating system invokes the idle task (stage P6). In turn, the primary idle task invokes the OS scheduler idle function (Stage O1). The OS scheduler reduces the priority of the primary operating system to $P_{IP}$. The OS Finer Grained Scheduler determines that the primary operating system is still the highest priority operating system and therefore does not switch to the secondary operating system. The OS scheduler exits from the OS scheduler idle function with a return value of 0.

The primary operating system continues execution of its idle task (stage P7). This task analyses the above return value and puts the CPU in the wait state (power save mode—stage P0).

When the CPU receives a secondary interrupt $I_S$, it executes the primary interrupt handler (stage P1). The priority of the primary operating system is raised from $P_{IP}$ to $P_{PH}$. The OS scheduler is not invoked at this stage for optimisation purposes because $P_{PH}$ is the highest priority.

The primary interrupt handler analyses the interrupt source, identifies it is a secondary interrupt and forwards a virtualised interrupt to the secondary operating system. The OS scheduler raises the priority of the secondary operating system from $P_{IS}$ to $P_S$. The OS scheduler is not invoked at this stage for optimisation purposes.

As result of the interrupt processing the barrier task Tb is woken up, i.e. it is scheduled by the primary operating system (stage P3). The barrier task, in turn, invokes the OS scheduler priority setting function. The OS scheduler reduces the priority of the primary operating system to $P_{PL}$ (stage O3) and invokes the Finer Grained OS Scheduler. The Finer Grained OS Scheduler determines that the secondary operating system now has the highest priority ($P_S > P_{PL}$) and switches to the secondary operating system.

When forwarding the virtualised interrupt to the secondary operating system, the OS scheduler modifies the context of the secondary operating system such that after switching, the secondary operating system executes its interrupt handler (stage S1).

As result of the interrupt processing, the secondary operating system schedules a requested process (stage S2). After completion, the secondary operating system invokes its idle task (stage S6).

The secondary idle task invokes the OS scheduler idle function (stage O1). The OS scheduler reduces the priority of the secondary operating system to $P_{IS}$. The Finer Grained OS Scheduler determines that the primary operating system is (again) the highest priority operating system and therefore switches to it. The OS scheduler exits the OS scheduler priority setting function with a return value of 0.

The primary operating system continues to execute the barrier task Tb which analyses the return value of the OS scheduler priority setting function and invokes a sleeping synchronisation primitive (stage P4).

The primary operating system then switches to its idle task (Stage P6). The idle task invokes the OS scheduler-idle function and reduces the priority of the primary operating system to $P_{IP}$ (Stage O1). The primary operating system is still the highest priority operating system and the idle task continues to be executed stage P7) and puts the CPU in the wait state (Stage P0).

Figure 8:
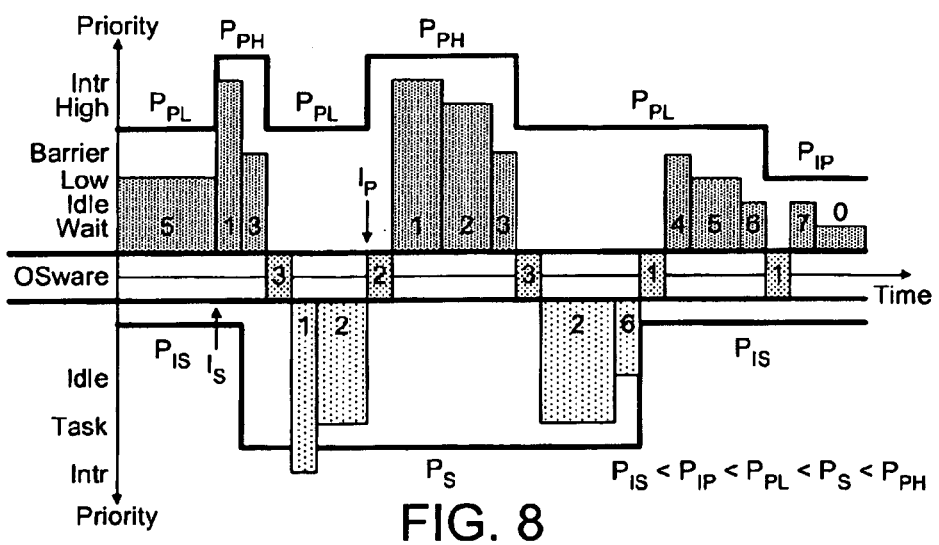

FIG. 8 illustrates a scenario in which the OS scheduler processes a secondary interrupt while the primary operating system executes a low priority real-time task. This scenario also includes processing of a primary interrupt received while the secondary operating system is running.

As illustrated in FIG. 8, the primary operating system executes a low priority real-time task (stage $P_S$). The secondary operating system is in the idle state. The priorities of the primary and secondary operating systems $P_{PL}$ and $P_{IS}$, respectively.

When the CPU receives the secondary interrupt $I_S$, it executes the primary interrupt handler (stage P1). The priority of the primary operating system is raised to $P_{PH}$. The OS scheduler is not invoked at this stage for optimisation purposes because $P_{PH}$ is the highest priority.

The primary interrupt handler analyses the interrupt source, identifies it is a secondary interrupt and forwards a virtualised interrupt to the secondary operating system. The OS scheduler raises the priority of the secondary operating system from $P_{IS}$ to $P_S$. The OS scheduler is not invoked for optimisation purposes because $P_{PH}$ still is the highest priority.

As result of the interrupt processing, the barrier task Tb is woken up. The barrier task Tb has a higher priority than the currently executed real-time task. As a consequence, primary operating system schedules the barrier task Tb which in turn invokes the OS scheduler priority setting function (stage P3). The OS scheduler reduces the priority of the primary operating system to $P_{PL}$ (stage O3) and invokes the Finer Grained OS Scheduler which determines that the secondary operating is the highest priority operating system ($P_S > P_{PL}$) and performs an operating system switch.

When forwarding the virtualised interrupt to the secondary operating system, the OS scheduler modifies the context of the secondary operating system such that after switching, the secondary operating system executes its interrupt handler (stage S1). As result of the interrupt processing, the secondary operating system schedules a requested process (stage S2).

While executing the secondary operating system, the CPU then receives a primary interrupt $I_P$. The OS scheduler performs an operating system switch forwards the interrupt for processing (stage O2). The priority of the primary operating system is raised to $P_{PH}$. The operating system switch is unconditional because the $P_{PH}$ now is the highest operating system priority.

As result of the interrupt processing a high priority real-time task is scheduled for execution (stage P2). Also, the barrier task Tb is woken up by the interrupt handler. However, it is not executed by the CPU yet because its priority is lower than that of the high priority real-time task.

When the high priority real-time task is completed, the primary operating system schedules the barrier task Tb (stage P3). The barrier task Tb invokes the OS scheduler priority setting function. The OS scheduler reduces the priority of the primary operating system to $P_{PL}$ (Stage O3) and invokes the Finer Grained OS scheduler. The Finer Grained OS scheduler determines that the secondary operating system now has the highest priority ($P_S > P_{PL}$) and performs an operating system switch.

The secondary operating system continues execution of the requested process (stage S2). Upon completion, the secondary operating system switches to its idle task (stage S6).

The secondary idle task invokes the OS scheduler idle function (Stage O1). The OS scheduler reduces the priority level of the secondary operating system to $P_{IS}$. The Finer Grained OS Scheduler determines that the primary operating system has the highest priority and performs and operating system switch. The OS scheduler exits the OS scheduler priority setting function with return value of 0. The Primary operating system continues execution of the barrier task Tb which analyses the return value and invokes a sleeping synchronization primitive (stage P4).

The primary operating system now schedules the low priority real-time task which was pre-empted by the barrier task Tb (stage $P_5$). Upon completion of this task, the primary operating system switches to its idle task (stage P6). This task invokes the OS scheduler idle function and reduces the priority of the primary operating system to $P_{IP}$ (stage O1). The primary operating system is still the highest priority operating system and the idle task is continued to be executed (stage P7) and puts the CPU in the wait state (Stage P0).

From this scenario it becomes clear that the secondary operating system can pre-empt the primary operating when the primary operating system is scheduled to execute a low priority real-time task. On the other hand, the primary operating system is still able to pre-empt the secondary operating system at any time to execute high priority real-time tasks.

For the next example, let us also suppose that there are two operating systems, namely the primary operating system and only one secondary operating system. As before, the primary operating system has two type of tasks: important high priority real-time tasks with short periods of continuous CPU activity and less important tasks with potentially long periods of continuous CPU activity. The secondary operating system has also two type of processes: high priority pseudo real-time processes and normal less important processes without strict deadlines.

The present embodiment is based on two conditions: First, less important tasks/processes can be removed from either operating system and rescheduled by the OS scheduler while the higher priority tasks/processes can meet their deadlines.

Second, less important tasks/processes will not be significantly affected if pre-empted by another operating system.

The OS scheduler operates the primary operating system on the following three priority levels $P_{IP}<P_{PL}<P_{PH}$. The secondary operating system is operated on the following three priority levels: $P_{IS}<P_{SL}<P_{SH}$. Between these levels, the following relation applies: $P_{IS}<P_{IP}<P_{SL}<P_{PL}<P_{SH}<P_{PH}$. In other words, important pseudo real-time secondary processes can pre-empt less important primary real-time-tasks. Also, less important primary real-time tasks can pre-empt less important secondary processes.

Dedicated tasks/processes are introduced in each operating system in order to separate high and low priority tasks/processes.

If the high priority real-time tasks executed by the primary operating system have a priority of $P_{RT}$ or higher and if the low priority tasks executed by the primary operating system have a priority of $P_{LT}$ or lower, the priority $P_{tb}$ of the barrier task Tb should be between $P_{RT}$ and $P_{LT}$: $P_{LT}<P_{tb}<P_{RT}$.

If the high priority processes executed by the secondary operating system have a priority of $P_{RP}$ or higher and if the low priority tasks executed by the secondary operating system have a priority of $P_{LP}$ or lower, the priority $P_{pb}$ of the barrier process Tb should be between $P_{RP}$ and $P_{LP}$: $P_{LT}<P_{pb}<P_{RP}$.

These priorities are not limited to any particular numerical values.

The primary barrier task Tb performs the following actions in an infinite loop:
  invoking the OS scheduler priority setting function with $P_{PL}$ as a parameter;
  if the return value is 1 reinvoking the OS scheduler priority setting function;
  otherwise invoking a sleeping synchronization primitive (such as a binary semaphore P operation)

The interrupt handler in the primary operating system is adapted to activate the barrier task Tb for each interrupt (through a binary semaphore V operation, for example).

Similarly the secondary barrier process Pb performs the following actions in an infinite loop:
  invoking the OS scheduler priority setting function with $P_{SL}$ as parameter;
  if the return value is 1, reinvoking the OS scheduler priority setting function;
  otherwise invoking a sleeping synchronization primitive (such as a binary semaphore P operation).

The interrupt handler in the secondary operating system is adapted to activate the barrier process Pb for each interrupt (through a binary semaphore V operation, for example).

Figure 9:
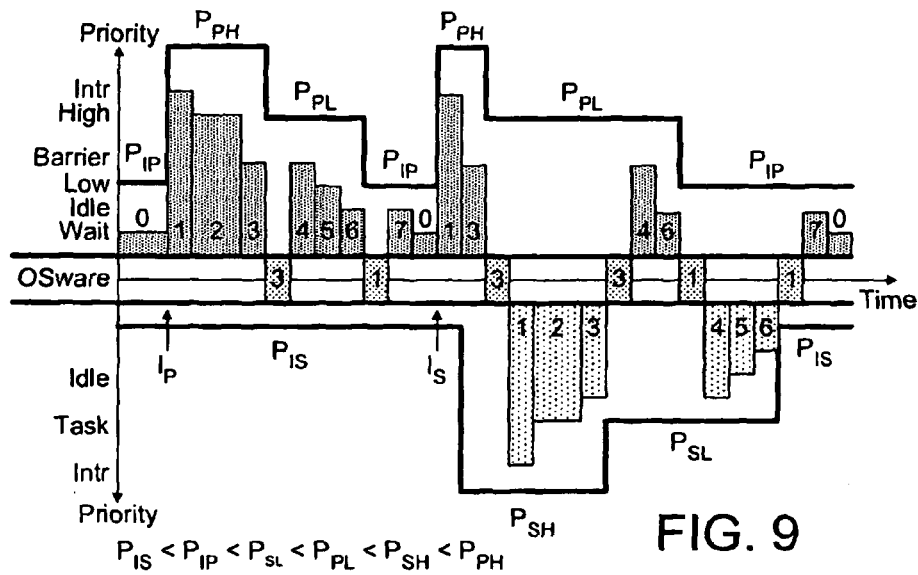

Next, the operation of the OS scheduler to process interrupts and schedule the primary and secondary operating systems while they are in the idle state will be described with reference to FIG. 9.

When the primary operating system is in the idle state it puts the CPU in the wait state (power saving mode stage P0).

Upon receipt of a primary interrupt $I_P$, the CPU executes the primary interrupt handler (stage P1). The priority of the primary operating system is raised from $P_{IP}$ to $P_{PH}$. The OS scheduler is not invoked at this stage for optimisation purposes because it is known that $P_{PH}$ is the highest operating system priority.

Let us suppose that as result of the interrupt processing two real-time task are requested for execution—high and low priority tasks. First, the primary operating system schedules the high priority real-time task (stage P2). Although the barrier task Tb is activated by the interrupt handler (as always), it is not yet executed on the CPU.

When the high priority real-time task is completed, the primary operating system schedules the barrier task Tb (stage P3), which in turn invokes the OS scheduler priority setting function. The OS scheduler reduces the priority of the primary operating system to $P_{PL}$ (stage O3) and invokes the Finer Grained OS scheduler. The Finer Grained OS Scheduler determines that the primary operating system is still highest priority operating system and therefore does not switch operating systems. The OS scheduler exits the OS scheduler priority setting function with a return value of 0.

The primary operating system continues execution of the barrier task Tb. The barrier task Tb analyses the above return value and invokes a sleeping synchronization primitive (stage P4).

The primary operating system then schedules the low priority real-time task (stage P5). When this task is completed the primary operating system switches to its idle task (Stage P6).

The primary idle task invokes OS scheduler idle function (stage O1). The OS scheduler reduces the priority of the primary operating system to $P_{IP}$. The Finer Grained OS Scheduler determines that the primary operating system is still the highest priority operating system and therefore does not switch operating systems. The OS scheduler exits the OS scheduler idle function with a return value of 0.

The primary operating system continues execution of its idle task (stage P7). The primary idle task analyses the above return value and puts the CPU in the wait state (power save mode—stage P0).

Upon receipt of a secondary interrupt $I_S$, the CPU executes the primary interrupt handler (stage P1). The priority of the primary operating system is raised from $P_{IP}$ to $P_{PH}$. The OS scheduler is not invoked at this stage for optimisation purposes because $P_{PH}$ is the highest priority.

The primary interrupt handler analyses the interrupt source, identifies it is a secondary interrupt and forwards a virtualised interrupt to the secondary operating system. The OS scheduler raises the priority of the secondary operating system from $P_{IS}$ to $P_{SH}$. As before the OS scheduler is not invoked for optimisation purposes because $P_{PH}$ is the highest priority.

As a result of the interrupt processing only the barrier task Tb is invoked by the primary operating system (stage P3). The barrier task Tb invokes the OS scheduler priority setting function. The OS scheduler reduces the priority of the primary operating system to $P_{PL}$ (stage O3) and invokes the Finer Grained OS Scheduler. The Finer Grained OS Scheduler determines that the secondary operating system now has the highest priority ($P_{SH}>P_{PL}$) and switches operating systems.

When forwarding the virtualised interrupt to the secondary operating system, the OS scheduler modifies the context of the secondary operating system such that after switching, the secondary operating system executes its interrupt handler (stage S1).

Let us suppose that as a result of the interrupt processing, two secondary processes are to be performed—a pseudo real-time process and a "normal" less important process. First, the secondary operating system schedules the pseudo real-time process (stage S2). The barrier process Pb is also activated by the interrupt handler but not yet executed by the CPU.

When the pseudo real-time task is completed, the secondary operating system schedules the barrier process Pb (stage S3), which invokes the OS scheduler priority setting function. The OS scheduler reduces the secondary operating system priority to $P_{SL}$ (stage O3) and invokes the Finer Grained OS Scheduler which determines that the primary operating system now has the highest priority and switches operating systems.

The primary operating system continues execution of its barrier task Tb. The barrier task Tb exits the OS scheduler priority setting function with a return value of 0. It analyses the return value and invokes a sleeping synchronization primitive (stage $P_4$).

The primary operating system now schedules its idle task (stage P6). The primary idle task invokes the OS scheduler idle function (stage O1). The OS scheduler reduces the primary operating system priority $P_{IP}$. The Finer Grained OS Scheduler determines that the secondary operating system again has the highest priority and switches operating systems.

The secondary operating system continues execution of its barrier process Pb. The barrier process exits the OS scheduler priority setting function with a return value of 0, analyses the return value and invokes a sleeping synchronisation primitive (stage S4).

Subsequently, the secondary operating system schedules the less important process (stage S5). When this process is completed the secondary operating system invokes its idle task (stage S6). The secondary idle task invokes the OS scheduler idle function (stage O1). The OS scheduler reduces the secondary operating system priority $P_{IS}$. The Finer Grained OS Scheduler determines that the primary operating system now has the highest priority and switches operating systems.

The primary operating system continues execution of its idle task (stage P7). This task exits the OS scheduler idle function with a return value of 0, analyses the return value and puts the CPU in the wait state (power save mode—Stage P0).

Figure 10:
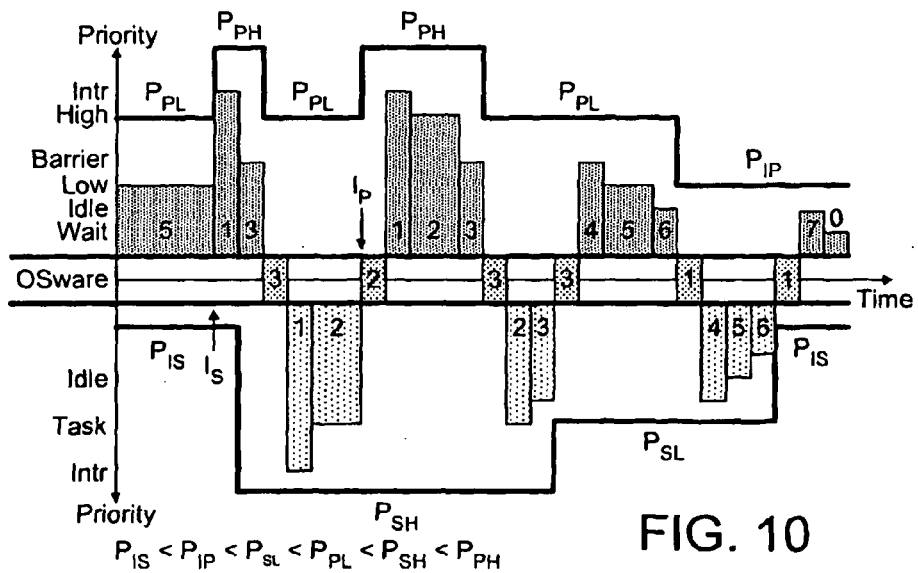

FIG. 10 illustrates how the OS scheduler processes a secondary interrupt while the primary operating system executes a low priority real-time task. FIG. 10 also illustrates how a primary interrupt is processed if it is received while the secondary operating system is running.

In the example of FIG. 10, the primary operating system executes a low priority real-time task (stage P5). The secondary operating system is in the idle state. The Primary and secondary operating system priorities are $P_{PL}$ and $P_{IS}$, respectively.

Upon receipt of a secondary interrupt $I_S$, the CPU executes the primary interrupt handler (stage P1). The priority of the primary operating system is raised from $P_{IP}$ to $P_{PH}$. The OS scheduler is not invoked at this stage for optimisation purposes because it is known that $P_{PH}$ is the highest priority.

The primary interrupt handler analyses the interrupt source, identifies it is a secondary interrupt and forwards a virtualised interrupt to the secondary operating system. The OS scheduler raises the secondary operating system priority from $P_{IS}$ to $P_{SH}$. As before the OS scheduler is not invoked for optimisation purposes at this stage.

As result of the interrupt processing the barrier task Tb is activated. The priority $P_{tb}$ of the barrier task Tb is higher than the priority $P_{TL}$ of the currently executed real-time. Therefore the barrier task Tb is scheduled by the primary operating system (stage P3). This barrier task Tb invokes the OS scheduler priority setting function. The OS scheduler reduces the primary operating system priority to $P_{PL}$ (stage O3) and invokes the Finer Grained OS Scheduler. The Finer Grained OS Scheduler determines that the secondary operating system now has the highest priority ($P_{SH}$>$P_{PL}$) and switches operating systems.

When forwarding the virtualised interrupt to the secondary operating system, the OS scheduler modifies the context of the secondary operating system such that after switching, the secondary operating system executes its interrupt handler (stage S1).

Let us suppose that as result of the interrupt processing, two secondary processes are to be executed: a pseudo real-time process and a "normal" less important process. The secondary operating system first schedules the pseudo real-time process (stage S2). The barrier process Pb is also activated by the interrupt handler but not yet executed on the CPU.

While running the secondary operating system, the CPU receives a primary interrupt $I_P$. The OS scheduler switches operating systems and forwards the interrupt to the primary operating system (stage O2). The primary operating system priority is raised to $P_{PH}$. It is noted that operating system switch is unconditional as it is known that $P_{PH}$ is the highest operating system priority.

As a result of the interrupt processing the high priority real-time task is activated, and the primary operating system switches to it (stage P2). Also, the barrier task Tb is activated by the interrupt handler but not yet executed on the CPU because its priority $P_{tb}$ is lower than $P_{RT}$.

When the high priority real-time task is completed, the primary operating system schedules the barrier task Tb (stage P3). The barrier task Tb invokes the OS scheduler priority setting function. The OS scheduler reduces the primary operating system priority to $P_{PL}$ (stage O3) and invokes the Finer Grained OS Scheduler. The Finer Grained OS Scheduler determines that the secondary operating system now has the highest priority ($P_{SH}$>$P_{PL}$) and switches operating systems.

The secondary operating system continues execution of its pseudo real-time process (stage S2). When this process is completed, the secondary operating system invokes its barrier process Pb (stage S3). The barrier process Pb invokes the OS scheduler priority setting function. The OS scheduler reduces the secondary operating system priority to $P_{SL}$ (stage O3) and invokes the Finer Grained OS Scheduler. The Finer Grained OS Scheduler determines that the primary operating system now has the highest priority and switch operating systems.

The primary operating system continues to execute its barrier task Tb. This task returns from the OS scheduler priority setting function with a return value of 0, analyses the return value and invokes a sleeping synchronisation primitive (stage P4).

The primary operating system switches to the pre-empted low priority real-time task (stage P5). When this task is completed, the primary operating system invokes its idle task (stage P6).

The primary idle task invokes the OS scheduler idle function (stage O1). The OS scheduler reduces the primary operating system priority to $P_{IP}$. The Finer Grained OS Scheduler determines that the secondary operating system again has the highest priority and switches operating systems.

The secondary operating system continues execution of its barrier process Pb. This process exits the OS scheduler priority setting function with a return value of 0, analyses the return value and invokes a sleeping synchronization primitive (stage S4).

The secondary operating system then schedules the less important process (stage S5). When this process is completed, the secondary operating system invokes its idle task (stage S6).

The secondary idle task invokes the OS scheduler idle function (stage O1). The OS scheduler reduces the secondary operating system priority to $P_{IS}$. The Finer Grained OS Scheduler determines that the primary operating system now has the highest priority and switches operating systems.

The primary operating system continues execution of its idle task (Stage P7). This task exits the OS scheduler idle function with a return value of 0 and puts the CPU in the wait state (power save mode—stage P0).

Figure 11:
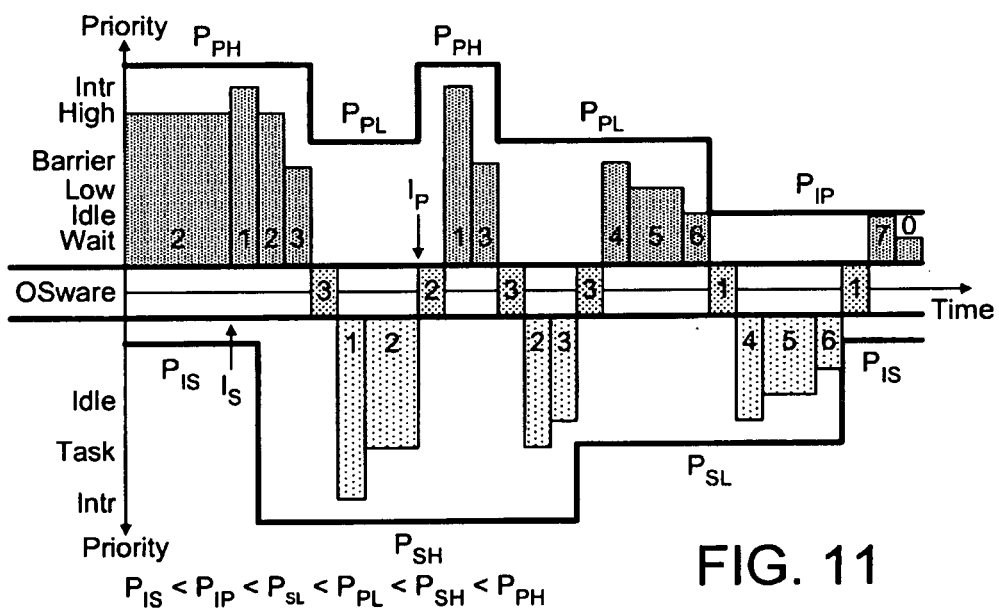

FIG. 11 illustrates how the OS scheduler processes a secondary interrupt while the primary operating system is executing a high priority real-time task. FIG. 11 also illustrates how a primary interrupt is processed and a low priority primary task is scheduled if the interrupt is received while the secondary operating system is running.

In the example of FIG. 11, the primary operating system executes a high priority real-time task (stage P2). The secondary operating system is in the idle state. The primary and secondary operating system priorities are $P_{PH}$ and $P_{IS}$, respectively.

Upon receipt of a secondary interrupt $I_S$, the CPU executes the primary interrupt handler (stage P1). The primary interrupt handler analyses the interrupt source, identifies it is a secondary interrupt and forwards a virtualised interrupt to the secondary operating system. The OS scheduler raises the secondary operating system priority from $P_{IS}$ to $P_{SH}$. The OS scheduler is not invoked at this stage for optimisation purposes because it is known that the current task has the highest priority $P_{PH}$.

As result of the interrupt processing the barrier task Tb is activated. The priority of the barrier task Tb is lower then the priority of the current real-time task $P_{TH}$, and therefore the primary operating system continues to execute its high priority real-time task (stage P2).

When this task is completed, the primary operating system schedules the barrier task Tb (stage P3). The barrier task Tb invokes the OS scheduler priority setting function. The OS Scheduler reduces the primary operating system priority to $P_{PL}$ (stage O3) and invokes the Finer Grained OS Scheduler. The Finer Grained OS Scheduler determines that the secondary operating system now has the highest priority ($P_{SH}>P_{PL}$) and switches operating systems.

When forwarding the virtualised interrupt to the secondary operating system, the OS scheduler modifies the context of the secondary operating system such that after switching, the secondary operating system executes its interrupt handler (stage S1).

Let us suppose that as result of the interrupt processing, two secondary processes are to be executed: a pseudo real-time process and "normal" less important process. First, the secondary operating system schedules the pseudo real-time process (stage S2). Also, the barrier process Pb is activated by the interrupt handler, although it is not yet running on the CPU.

While running the secondary operating system, the CPU receives a primary interrupt $I_P$. The OS scheduler performs an operating system switch and forwards the interrupt to the primary operating system (stage O2). The primary operating system priority is raised to $P_{PH}$. The operating system switch is unconditional as it is known that $P_{PH}$ is the highest operating system priority.

As result of the interrupt processing, a low priority real-time task is activated. Also, the barrier task Tb is activated by the interrupt handler. The priority $P_{tb}$ of the barrier task is higher then $P_{LT}$, and the primary operating system switches to it (stage P3).

This task invokes the OS scheduler priority setting function. The OS scheduler reduces the primary operating system priority to $P_{PL}$ (stage O3) and invokes the Finer Grained OS scheduler which determines that the secondary operating system now has the highest priority ($P_{SH}>P_{PL}$) and performs an operating system switch.

The secondary operating system continues to execute its pseudo real-time process (stage S2). Upon completion of this task, the secondary operating system invokes its barrier process Pb (stage S3). The barrier process Pb invokes the OS scheduler priority setting function. The OS scheduler reduces the secondary operating system priority to $P_{SL}$ (Stage O3) and invokes the Finer Grained OS Scheduler. The Finer Grained OS Scheduler determines that the primary operating system now has the highest priority and switches operating systems.

The primary operating system continues to execute its barrier task Tb. The barrier task returns from the OS scheduler priority setting function with a return value of 0, analyses the return value and invokes a sleeping synchronization primitive (stage P4).

The primary operating system switches back to the earlier active low priority real-time task (stage P5). Upon completion of this task, the primary operating system invokes its idle task (stage P6).

The primary idle task invokes the OS scheduler idle function (stage O1). The OS scheduler reduces the primary operating system priority to $P_{IP}$. Also, the Finer Grained OS Scheduler determines that the secondary operating system again has the highest priority and switches operating systems.

The secondary operating system continues to execute its barrier process Pb. The barrier process Pb returns from the OS scheduler priority setting function with a return value of 0, analyses the return value and invokes a sleeping synchronisation primitive (stage S4).

The secondary operating system then schedules the less important process (stage S5). When this process is completed the secondary operating system invokes its idle task (stage S6).

The secondary idle task invokes the OS scheduler idle function (stage O1). The OS scheduler reduces the secondary operating system priority $P_{IS}$. The Finer Grained OS Scheduler determines that the primary operating system now has the highest priority and switches operating systems.

The primary operating system continues to execute its idle task (stage P7). The idle task returns from the OS scheduler idle function with a return value of 0 and puts the CPU in the wait state (power save-mode—Stage P0).

The above method can as well be used when there are multiple secondary operating systems. Each secondary operating system should include a barrier task functionality in order to change its priority.

In an alternative embodiment there can be multiple barrier tasks in each operating system, thereby to be able to distinguish different operating system activities on an even "finer grain" level.

Dedicated barrier tasks are well suited to call the OS scheduler priority setting function. In this way a priority based OS scheduler can be used to decide that there is no more activity of a predetermined kind, as described above.

The OS scheduler priority setting function can also be invoked in other "strategic" instances. For example it can be invoked at the end of interrupt processing when a current task/process is resumed. In this way only secondary interrupt processing is considered a high priority activity.

If some secondary interrupts are to be considered more important than others, some precautionary measures should be taken. The OS scheduler priority setting function should not be called immediately after an interrupt source analysis to drop the operating system priority if less important secondary interrupts are to be processed. Interrupts can be nested, and if less important interrupts can be received by the CPU while the interrupt handler processes a more important interrupt, the operating system priority is reduced too early.

In this case the secondary operating system should defer invoking the OS scheduler priority setting function.

System Hardware

Figure 12:
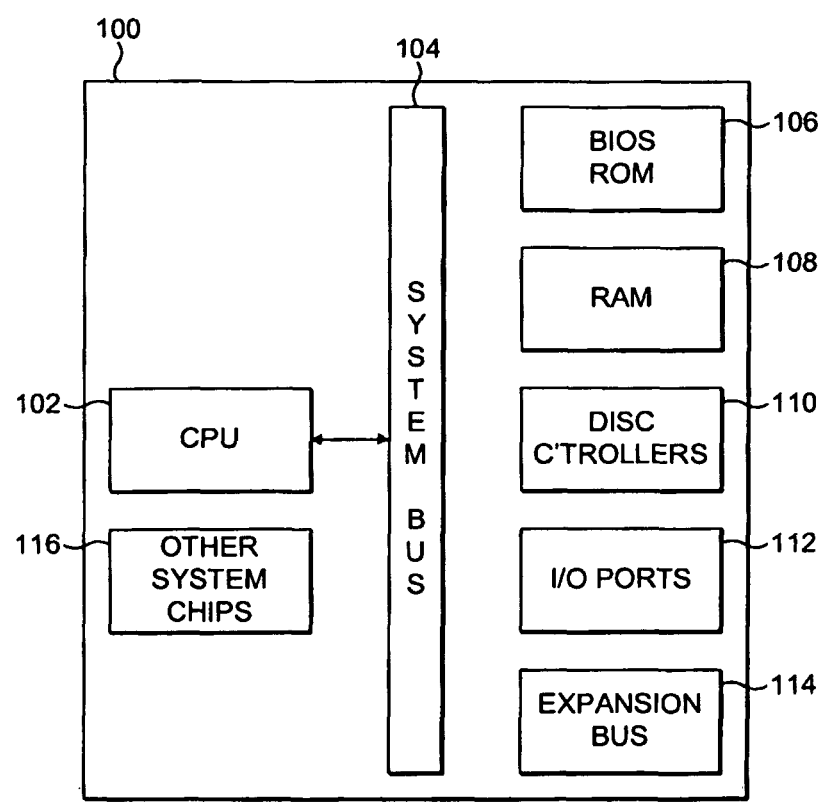
FIG. 12 is a block diagram showing the elements of a computer system on which the present invention can execute.

FIG. 12 illustrates a computer system 100 on which the above method can be implemented comprises a central processing unit (CPU) 102, such as a Pentium 4™ CPU available from Intel Corporation, or PowerPC CPU available from Motorola coupled via a system bus 104 (comprising control, data and address buses) to a read-only memory (ROM) chip 106; one or more banks of random access memory (RAM) chips (108); disk controller devices 110 (for example IDE or SCSI controllers, connected to a floppy disk drive, a hard disk drive, and additional removable media drives such as DVD drives); one or more input/output ports (112) (for example, one or more USB port controllers, and/or parallel port controllers for connection to printer and so on); an expansion bus 114 for bus connection to external or internal peripheral devices (for example the PCI bus); and other system chips 116 (for example, graphics and sound devices). Examples of computers of this type are personal computers (PCs) and workstations. However, the application of the invention to other computing devices such as mainframes, embedded microcomputers in control systems, and PDAs (in which case some of the indicated devices such as disk drive controllers may be absent) is also disclosed herein.

Management of Software

Figure 13:
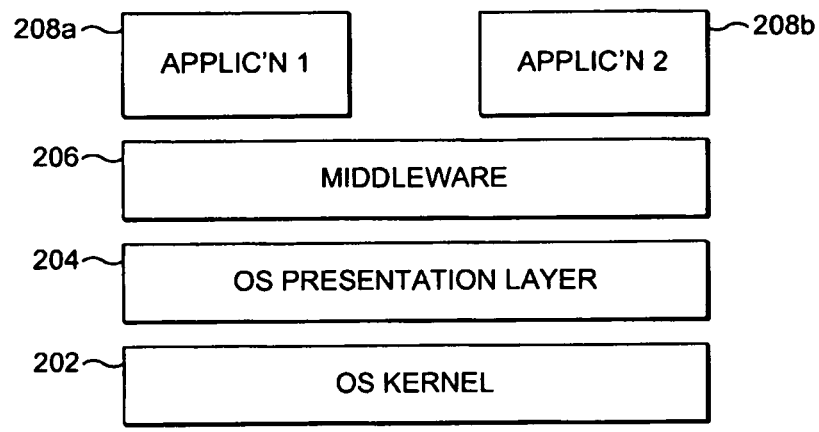
FIG. 13 is a diagram illustrating the arrangement of software in the prior art.
Figure 14:
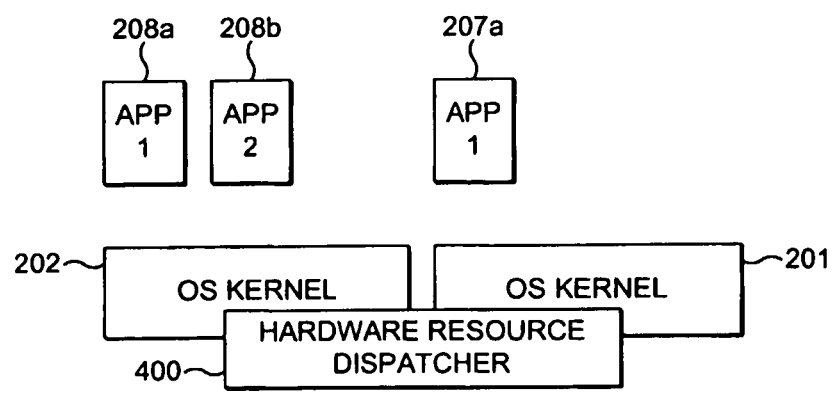
FIG. 14 is the corresponding diagram illustrating the arrangement of software according to the present embodiment.

Referring to FIGS. 13 and 14, in use, the computer 100 of FIG. 20 runs resident programs comprising operating system kernel 202 (which provides the output routines allowing access by the CPU to the other devices shown in FIG. 20); an operating system user interface or presentation layer 204 (such as X Windows); a middleware layer 206 (providing networking software and protocols such as, for instance, a TCP/IP stack) and applications 208a, 208b, which run by making calls to the API routines forming the operating system kernel 202.

The operating system kernel has a number of tasks, in particular:

scheduling (i.e., sharing the CPU and associated resources between different applications which are running);
memory management (i.e. allocating memory to each task, and, where necessary, swapping data and programs out of memory add on to disk drives);
providing a file system;
a providing access to devices (typically, through drivers);
interrupt handling;
providing an applications programming interface enabling the applications to interact with system resources and users.

The kernel may be a so-called "monolithic kernel" as for Unix, in which case the device drivers form part of the kernel itself. Alternatively, it may be a "microkernel" as for Chorus, in which case the device drivers are separate of the kernel.

In use, then, when the computer 100 is started, a bootstrap program stored in ROM 106 accesses the disk controllers 110 to read the file handling part of the operating system from permanent storage on disk into RAM 108, then loads the remainder of the operating system into an area of RAM 108. The operating system then reads any applications from the disk drives via the disk controllers 110, allocates space in RAM 108 for each, and stores each application in its allocated memory space.

During operation of the applications, the scheduler part of the operating system divides the use of the CPU between the different applications, allowing each a share of the time on the processor according to a scheduling policy. It also manages use of the memory resources, by "swapping out" infrequently used applications or data (i.e. removing them from RAM 108 to free up space, and storing them on disk).

Finally the routines making up the applications programming interface (API) are called from the applications, to execute functions such as input and output, and the interrupt handling routines of the operating system respond to interrupt and events.

Other Aspects and Embodiments

It will be clear from the forgoing that the above-described embodiments are only examples, and that many other embodiments are possible. The operating systems, platforms and programming techniques mentioned may all be freely varied. Any other modifications, substitutions and variants which would be apparent to the skilled person are to be considered within the scope of the invention, whether or not covered by the claims which follow. For the avoidance of doubt, protection is sought for any and all novel subject matter and combinations thereof disclosed herein.

The invention claimed is:

1. A method of enabling multiple operating systems to run on the same CPU, the method comprising:
   scheduling a plurality of tasks for execution by at least first and second operating systems, wherein each task has one of a plurality of first priorities;
   assigning a second priority to each operating system;
   providing a common program arranged to compare the second priorities of all operating systems and to run the operating system having the highest second priority on the CPU;
   activating a barrier task in a given operating system in response to an interrupt for the given operating system; and
   scheduling the barrier task for execution in the given operating system when the barrier task has the highest first priority in the given operating system,
   wherein each operating system causes the common program to change its priority when it switches from one task to another task having a lower priority, and
   wherein each operating system can invoke the common program to decrease its priority.

2. The method of claim 1, wherein each operating system performs the barrier task in between consecutive tasks, thereby to split consecutive tasks into tasks of different importance.

3. The method of claim 2, wherein the barrier routine is performed in response to an interrupt.

4. The method of claim 2, wherein the common program pre-empts the operating system performing the barrier task if, after decreasing its priority, another operating system has a higher priority, and passes control to the higher priority operating system.

5. The method of claim 2 wherein, if control is passed to the higher priority operating system, the barrier task remains active.

6. The method of claim 5, comprising resuming performance of the barrier task when control is passed back to the operating system in which the barrier task has remained active.

7. The method of claim 2, wherein the common program is invoked to pass control to the operating system having the highest priority when a barrier task has been performed.

8. The method of claim 2, wherein each operating system is adapted to perform multiple barrier tasks, wherein each barrier task is associated with tasks of a specific priority and/or each barrier task causes a different decrease of the priority of the respective operating system.

9. The method of claim 1, wherein each operating system is arranged to invoke the common program to cause a decrease of its own priority.

10. The method of claim 9, wherein each operating system causes a decrease of its own priority upon completion of a task if no further task having a priority equal to or higher than the priority of the completed task is scheduled for execution.

11. The method of claim 1, wherein the common program is adapted to increase the priority of any of the operating systems.

12. The method of claim 11, wherein the common program increases the priority of an operating system when that operating system receives an interrupt.

13. The method of claim 12, wherein the common program increases the priority of an operating system to a respective highest level when that operating system receives an interrupt.

14. The method of claim 1, wherein the common program is invoked to pass control to the operating system having the highest priority after an operating system has become inactive.

15. The method of claim 1, wherein the common program is invoked to pass control to the operating system having the highest priority after the priority of an operating system has been set to a different level.

16. The method of claim 1, wherein each operating system has a highest priority, wherein the highest priority of the first operating system is higher than the highest priority of the other priority systems.

17. A non-transitory computer storage medium containing programmable code which, when executed by a computer, including at least one processor, accessible input/output and at least one data store, performs the method of claim 1.

18. A computer system including at least one processor, accessible input/output, and at least one data store arranged to perform the method of claim 1.

19. The method of claim 1, wherein the common program decreases the second priority of an operating system in response to being invoked by that operating system, or increases the second priority of an operating system in response to an interrupt for that operating system.

20. The method of claim 1, wherein the priority of an operating system can only be increased by the common program upon receipt of an interrupt intended for that operating system.

21. The method of claim 1, wherein no operating system causes the common program to increase its priority.

22. A method of enabling multiple operating systems to run on the same CPU, the method comprising:
   scheduling a plurality of tasks for execution by at least first and second operating systems, wherein each task has one of a plurality of first priorities;
   assigning a second priority to each operating system;
   providing a common program arranged to compare the second priorities of all operating systems and to run the operating system having the highest second priority on the CPU; and
   a given operating system executing a barrier task, wherein executing the barrier task comprises passing control to the common program to cause a decrease of the second priority of the given operating system,
   wherein each operating system causes the common program to change its priority when it switches from one task to another task having a lower priority, and
   wherein each operating system can invoke the common program to decrease its priority.

23. The method of claim 22, wherein each operating system performs the barrier task in between consecutive tasks, thereby to split consecutive tasks into tasks of different importance.

24. The method of claim 23, wherein the barrier routine is performed in response to an interrupt.

25. The method of claim 24, wherein, if control is passed to the higher priority operating system, the barrier task remains active.

26. The method of claim 25, comprising resuming performance of the barrier task when control is passed back to the operating system in which the barrier task has remained active.

27. The method of claim 23, wherein the common program pre-empts the operating system performing the barrier task if, after decreasing its priority, another operating system has a higher priority, and passes control to the higher priority operating system.

28. The method of claim 23, wherein the common program is invoked to pass control to the operating system having the highest priority when a barrier task has been performed.

29. The method of claim 23, wherein each operating system is adapted to perform multiple barrier tasks, wherein each barrier task is associated with tasks of a specific priority and/or each barrier task causes a different decrease of the priority of the respective operating system.

30. The method of claim 22, wherein each operating system is arranged to invoke the common program to cause a decrease of its own priority.

31. The method of claim 30, wherein each operating system causes a decrease of its own priority upon completion of a task if no further task having a priority equal to or higher than the priority of the completed task is scheduled for execution.

32. The method of claim 22, wherein the common program is adapted to increase the priority of any of the operating systems.

33. The method of claim 32, wherein the common program increases the priority of an operating system when that operating system receives an interrupt.

34. The method of claim 33, wherein the common program increases the priority of an operating system to a respective highest level when that operating system receives an interrupt.

35. The method of claim 22, wherein the common program is invoked to pass control to the operating system having the highest priority after an operating system has become inactive.

36. The method of claim 22, wherein the common program is invoked to pass control to the operating system having the highest priority after the priority of an operating system has been set to a different level.

37. The method of claim 22, wherein each operating system has a highest priority, wherein the highest priority of the first operating system is higher than the highest priority of the other priority systems.

38. A non-transitory computer storage medium containing programmable code which, when executed by a computer, including at least one processor, accessible input/output and at least one data store, performs the method of claim 22.

39. A computer system including at least one processor, accessible input/output, and at least one data store arranged to perform the method of claim 22.

40. The method of claim 22, wherein the common program decreases the second priority of an operating system in response to being invoked by that operating system, or increases the second priority of an operating system in response to an interrupt for that operating system.

41. The method of claim 22, wherein the priority of an operating system can only be increased by the common program upon receipt of an interrupt intended for that operating system.

42. The method of claim 22, wherein no operating system causes the common program to increase its priority.

43. A method of enabling multiple operating systems to run on the same CPU, the method comprising:
- scheduling a plurality of tasks for execution by at least first and second operating systems, wherein each task has one of a plurality of first priorities;
- assigning a second priority to each operating system;
- providing a common program arranged to compare the second priorities of all operating systems and to run the operating system having the highest second priority on the CPU; and
- a given operating system executing a barrier task, wherein, if the common program pre-empts the given operating system and passes control to an operating system having a higher second priority, the barrier task in the given operating system remains active until it is next scheduled for execution,
- wherein each operating system causes the common program to change its priority when it switches from one task to another task having a lower priority, and
- wherein each operating system can invoke the common program to decrease its priority.

44. The method of claim 43, wherein the priority of an operating system can only be increased by the common program upon receipt of an interrupt intended for that operating system.

45. The method of claim 43, wherein no operating system causes the common program to increase its priority.

* * * * *